United States Patent
Mauchan

[11] Patent Number: 5,784,651
[45] Date of Patent: Jul. 21, 1998

[54] PHOTO BOOTH WITH MODULAR CONSTRUCTION

[75] Inventor: Donald E. Mauchan, Marlboro, Mass.

[73] Assignee: Polaroid Corporation, Cambridge, Mass.

[21] Appl. No.: 749,497

[22] Filed: Nov. 15, 1996

[51] Int. Cl.⁶ ............................................. G03B 15/06
[52] U.S. Cl. ...................................................... 396/2
[58] Field of Search ............................. 396/1, 2, 3, 4

[56] References Cited

U.S. PATENT DOCUMENTS

| | | | |
|---|---|---|---|
| 1,576,674 | 3/1926 | Olsen | 396/2 |
| 3,693,522 | 9/1972 | Chiesa | 396/2 |
| 3,820,136 | 6/1974 | Kennedy | 354/81 |
| 3,821,760 | 6/1974 | Kennedy et al. | 95/14 |
| 3,852,783 | 12/1974 | Kennedy et al. | 354/174 |
| 4,091,397 | 5/1978 | Gulbrandsen | 354/81 |
| 4,771,305 | 9/1988 | Potoroka | 396/1 |
| 5,067,049 | 11/1991 | Milaire | 396/4 |
| 5,262,815 | 11/1993 | Aumiller | 396/2 |
| 5,446,515 | 8/1995 | Wolfe et al. | 354/290 |
| 5,478,129 | 12/1995 | Goto et al. | 296/24.1 |
| 5,589,902 | 12/1996 | Gruel et al. | 396/3 |

*Primary Examiner*—Howard B. Blankenship
*Attorney, Agent, or Firm*—Wolfgang E. Stutius; Gaetano D. Maccarone

[57] ABSTRACT

A photo booth for capturing an image of a subject and providing reproductions of the image is constructed from self-contained modules—an apparatus module and a background module—linked via a roof module and a floor member. The modules can be easily bundled for handling and storing and occupy, when bundled together, a substantially smaller floor space than when the modules are secured to each other for operation as a photo booth. The apparatus module includes an image capturing device, such as a photographic camera using self-developing film, an electronic camera or a combination thereof, and an image reproduction device and may further include means for illuminating the subject, for image processing and display and for receiving payment. Means for controlling the temperature and humidity inside the apparatus module may also be provided. The apparatus module may also be used as a stand-alone unit. Translucent panels adapted to be illuminated for displaying messages may be secured to the outside walls of the modules.

7 Claims, 3 Drawing Sheets

PHOTO BOOTH WITH MODULAR CONSTRUCTION

BACKGROUND OF THE INVENTION

The invention relates to an enclosure for automatically capturing an image of a subject and providing a reproduction of such image, in particular a photo booth having a modular construction, adapted for ease of transport, handling and storing and affording protection against the environment.

Automatic photo booths in which the user can take an instant photographic image, especially a self portrait, have become popular with the advent of photography on self-developing film, as described, for example, in U.S. Pat. No. 3,821,760 being assigned to the same assignee as the present invent ion and which is incorporated herein by reference. A photo booth of this type usually includes a housing comprising a studio or background compartment containing a seat for the subject and a set of lights, preferably strobe lights, and an apparatus compartment adjacent to the studio compartment containing a camera, an apparatus for automatically operating the camera to expose a film unit and then processing the exposed film unit when payment for the photographic image is deposited by the user. Whereas the camera in the photo booth described above uses self-developing film, more recently electronic image capturing devices, such as electronic still cameras or video cameras, together with viewing means, such as video displays, liquid crystal displays or the like, have either been added in addition to the film camera to provide a preview of the film image or have replaced the film cameras entirely. In the latter case, the reproduction may be created by electronic output means, such as electronic devices exposing film, thermal printers, ink jet printers or the like.

Although the flexibility with which instant images can be produced in an automatic photo booth and the quality of these images has vastly improved since the inception of the photo booth through the addition of novel features, especially of an electronic nature, the basic construction of the photo booth has remained largely unchanged. The photo booths known in the art are assembled as one unit comprising the aforedescribed two housings and a floor panel and a ceiling panel for spacing the two housings apart. Because of the distance required between the camera and the subject being photographed, the space between the two housings can be substantial, consequently requiring a large floor space for the assembled photo booth which remains unchanged even when the booth is handled and/or stored. As a consequence of this type of construction of the assembled photo booth, handling and moving of the photo booth disadvantageously requires heavy equipment, which is expensive and may prevent the placement of the photo booth at locations with limited access. It is therefore desirable to construct a photo booth occupying a smaller floor space during handling and storage than when ready for operation as a photo booth.

U.S. Patent 5,478,129 describes a movable photo studio vehicle wherein side boards are dropped to a lower horizontal position forming floor boards after the vehicle has arrived on location. Flexible pipes are then inflated to define, in conjunction with a sheet, an enlarged tent-like structure for operation and manipulation of the photographic equipment therein. Japanese Utility Model No. 13431/1992 describes a studio vehicle having folding panels for defining an enlarged interior space. Both of these devices, however, are mounted on a vehicle and do not provide the utility associated with a stand-alone photo booth.

OBJECT AND SUMMARY OF THE INVENTION

With the foregoing in mind, it is therefore an object of the invention to provide a novel photo booth of modular design adapted for convenient assembly, disassembly and handling. It is another object of the invention that the photo booth, in its disassembled state, can be bundled in a manner where it occupies a substantially smaller floor space than when it is operational as a photo booth, thereby being capable of being transported without the need for heavy equipment.

It is a further object of the invention to provide an enclosed space inside at least one of the modules for housing the image capturing means, the image processing means, the image reproduction means, as well as for lighting, viewing and payment means and the like, thereby enabling an efficient control of the environmental conditions, like temperature and humidity, inside the enclosed space.

It is a further object of the invention to provide a photographic background for the subject to be photographed or to provide means for overlaying the image of the subject with a preselected background to create a composite image.

It is another object of the invention to secure translucent panels which can be illuminated, to the outside of at least one of the modules to provide space for messages, advertising or the like.

It is a further object of the invention to provide a photo booth of strong and stable construction.

It is also an object of the invention to be able to use the modular section comprising the image capturing means as a stand-alone unit for photography in a natural setting without requiring modifications.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
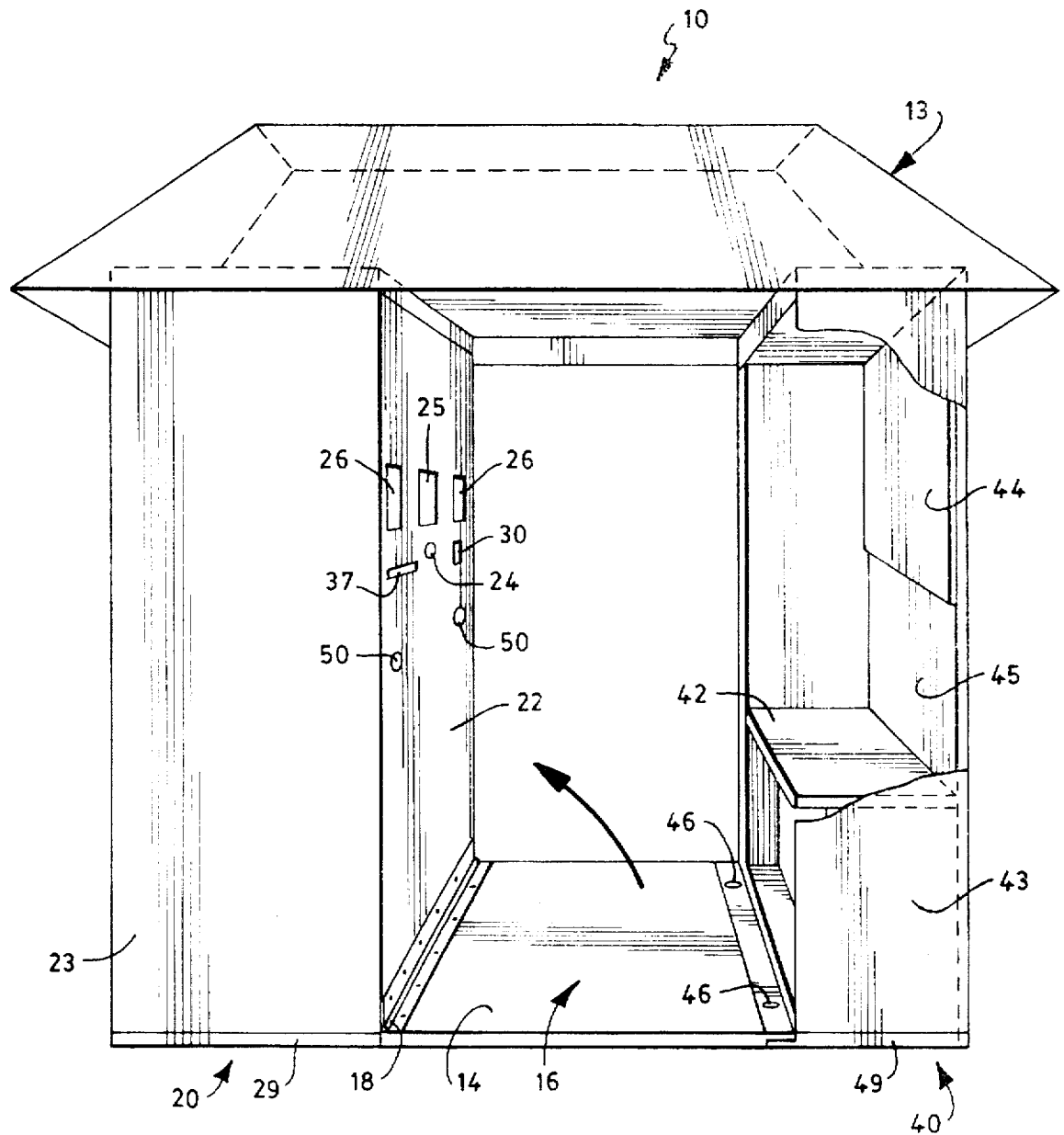
FIG. 1 is a side view of a modular photo booth according to an embodiment of the invention in the assembled state and ready for taking pictures, with parts of the modules omitted for the sake of clarity.

Several preferred embodiments of the invention will be described hereinafter with reference to the drawings. Like parts are referenced with like numbers. Referring first to FIG. 1, there is shown a side view of a photo booth 10 according to the present invention including an apparatus module 20 which is shown for purposes of illustration as an upstanding box-like structure with a front wall 22, side walls 23, a back wall (not shown), a top 28 (not shown in FIG. 1) and a bottom 29, but which may have other suitable shapes; a background (or studio) module 40 also illustrated as an upstanding box structure with a back wall 45, side walls 43, a top 48 (not shown in FIG. 1) and a bottom 49, a hinged floor panel 14 linking the bottom 29 of the apparatus module 20 and the bottom 49 of the background module 40, and a detachable roof module 13 linking the top 28 of the apparatus module 20 and the top 48 of the background module 40. The apparatus module 20 comprises an image capturing device 24 disposed behind the front wall 22 for capturing an image of a subject (not shown) positioned in an imaging zone 16, an optional image processing means (not shown) for processing the captured image, an optional display 25 for displaying the captured or processed image, an optional lighting means 26, such as lamps or strobes, for illuminating the subject, an optional payment mechanism 30 for accepting payment in the form of coins, bills, credit cards or the like, and an outlet 37 for dispensing a printed reproduction of the image. Additional known control devices for measuring the distance between the subject and the image capturing device 24 and for aiding in focusing the image capturing device 24 and for releasing a shutter (not shown) in the image capturing device 24 may also be included in the apparatus module 20, but are not shown for the sake of clarity.

The apparatus module 20 is preferably sealed from the ambient air against moisture and dust and may also comprise means (not shown) for controlling its internal conditions, such as a heater, an air conditioner and/or a dehumidifier or humidifier, located inside the apparatus module 20 to ensure consistency in the capturing, processing and reproducing of the images. This is especially important when the apparatus module 20 is subjected to extreme external temperatures and humidity, like hot weather, rain, fog or snow, all of which may create conditions outside the suggested operating environment of the devices or components disposed inside the apparatus module 20.

The image capturing device 24 may be a photographic camera using selfdeveloping film, as described for example in U.S. Pat. No. 3,821,760, or an electronic camera providing image data in the form of an electronic output signal. The image capturing device 24 may also include a combination of an electronic camera (not shown) and a photographic camera (not shown) using self-developing film, whereby the electronic camera supplies the electronic signal to a display 25 for viewing the scenic composition of the image to be taken, and the photographic camera provides the actual reproduced output on self-developing film via the dispense outlet 37.

Where the reproduction of the captured image is to be generated from the electronic camera output signal, the image data may be electronically enhanced by known methods or the data may be superimposed with electronically stored background image data to create a composite scene as desired by the subject. The reproduction of the image may be provided by any known suitable means, such as a thermal printer, an ink-jet printer or an electronic printer using self-developing film, all of which are known in the art.

The payment mechanism 30 which is also known in the art, may be adapted to accept coins, currency bills, credit cards, tokens, or the like, and functions to permit capturing and/or reproducing of the image or images upon receipt and/or verification of the payment.

In a preferred embodiment, the floor 14 is pivotally attached, for example via a hinge 18, along one edge to the bottom 29 of the apparatus module 20 for pivoting about a horizontal axis, and detachably secured, along its opposite free edge, to the bottom 49 of the background module 40 via a plurality of releasable fasteners 46. Alternately, the floor 14 may be pivotally attached to the bottom 49 of background module 40 and detachably secured to the bottom 29 of the apparatus module 20. In another preferred embodiment, the floor 14 is detachably secured along the one edge to the bottom 29 of the apparatus module 20 and detachably secured along the opposite edge to the bottom 49 of the background module 40.

The background module 40 may comprise a seat 42, which is preferably adjustable in height, and a background 44, wherein the background 44 may comprise patterned, colored, printed, and/or pictured areas and may be selected by the subject to be photographed as desired. The background 44 may also be of a uniform blue color, allowing an electronic overlay of the image of the subject captured by the image capturing device 24 when the image capturing device 24 is an embodied as an electronic camera, and an electronically stored background to be displayed on the display 25 by a process which is known in the art.

The roof module 13 may be secured to the top of the apparatus module 20 and the background module 40, respectively, for example via keyed releasable fasteners 52, 53, 54 and 55 (see FIG. 2) to facilitate assembly and handling. In a preferred embodiment, utility connections between the apparatus module 20 and the background module 40, for example for electrical power and data communication, can be provided via the roof 13 by means of the keyed fasteners 52, 53, 54 and 55 or other connectors (not shown).

When the booth is assembled, as shown in FIG. 1, the free edge of the floor 14 is detachably secured to the bottom 49 of the background module 40 via the releasable fasteners 46 comprising screws or similar releasable connections. When the photo booth is prepared for transport and/or shipment, the floor 14 in FIG. 1 is pivoted about the hinged support 18 into a vertical position proximate to the front wall 22 and secured to the front wall 22 via the releasable fasteners 46 engaging in mating catches 50. The roof 13 is also detached by releasing the keyed fasteners 52, 53, 54 and 55.

Although the floor 14 provides the best defined and most stable alignment between the apparatus module 20 and the background module 40, the modular photo booth 10 according to the invention may instead of or in addition to the hinged floor 14 include a removable or hinged side panel (not shown) functioning in the same manner as the hinged floor 14.

Figure 2:
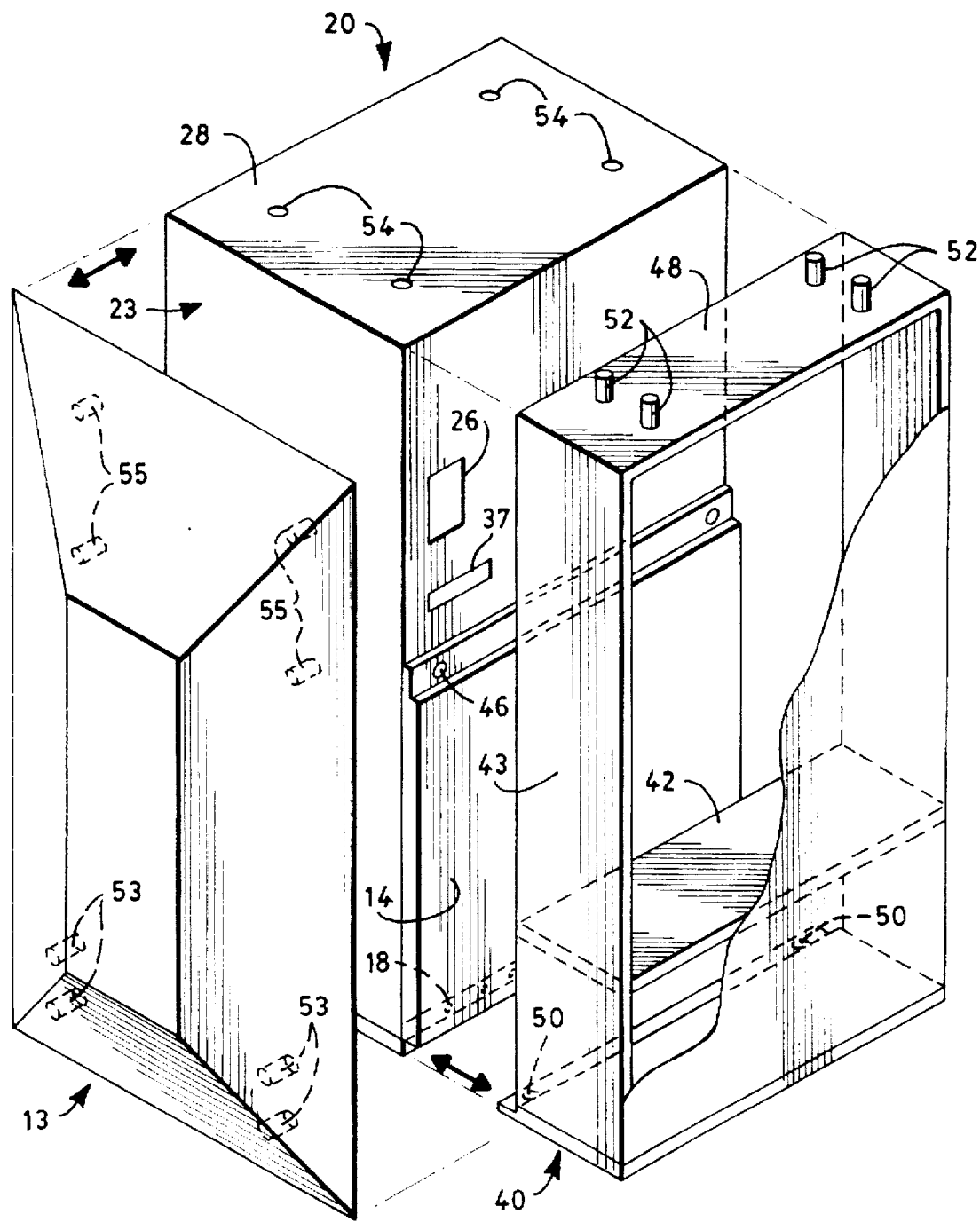
FIG. 2 is a perspective view of the photo booth of FIG. 1 with the individual modules separated and arranged for bundling for shipping and storing.

The three modules 20, 40, 13, when detached from each other and with the floor 14 secured to wall 22, are shown in FIG. 2. The background module 40 can now be moved adjacent to the apparatus module 20 and the roof 13 can be oriented in such a way as to abut the side 23 of the apparatus module 20 and the side 43 of the background module 40, thereby occupying a floor space which is substantially smaller than the floor space occupied when the apparatus module 20, background module 40 and roof module 13 are secured to each other for operation as a photo booth. For transport and/or storage, the three modules may be secured together with straps or the like.

Figure 3:
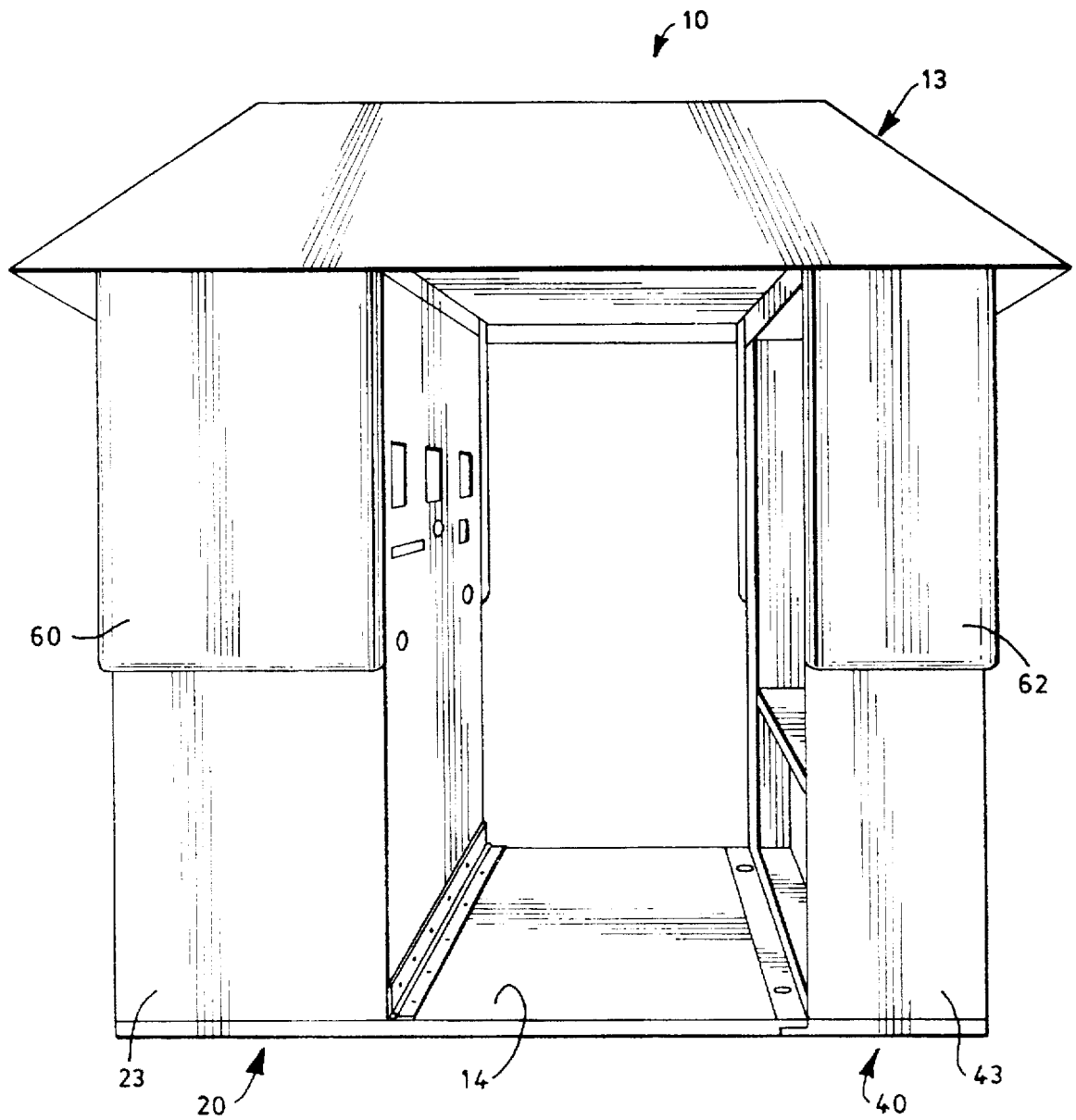
FIG. 3 is a side view of another embodiment of the modular photo booth according to the invention including translucent backlit panels for display purposes.

FIG. 3 shows another preferred embodiment, wherein translucent panels 60, 62 are secured to the side walls 23 and the back wall (not shown) of the apparatus module 20 and to the side walls 43 and the back wall (not shown) of the background module 40, respectively, projecting outwardly therefrom. Illuminating means (not shown), such as fluorescent lamps, may be provided for illuminating the panels and preferably disposed in the space between the panels 60, 62 and the outside of the walls 23, 43. The translucent panels 60, 62 may display information, for example company logos, advertising, messages, maps or the like. Likewise, additional translucent and preferably illuminated panels (not shown) may also be secured to the outside of the roof 13.

In another preferred embodiment, the apparatus module 20 may be used as a stand-alone unit, without the background module 40 and the roof 13 attached, for photography where the natural surroundings are desired as part of the background.

The invention as described above provides a modular photo booth which can be conveniently transported and stored and which can be used either with a preselected background or with a natural background setting, without requiring modifications to the modules. The image taking and processing portion of the apparatus can be housed in an environmentally controlled enclosure.

While there have been described what at present are considered to be the preferred embodiments of the present invention, it will be readily apparent to those skilled in the art that various changes and modifications may be made therein without departing from the invention, and it is intended in the appended claims to cover such changes and modifications as fall within the true spirit and scope of the invention.

What is claimed:

1. A photo booth for capturing an image of a subject, the booth comprising:

an apparatus module comprising a plurality of wall members cooperatively connected to define an enclosed space, said space including means for receiving an image capturing device and an image reproduction device;

a background module comprising a plurality of wall members cooperatively connected to define a subject receiving space including means for providing a background for the image;

a floor member having two ends, the first end comprising a hinge secured to one of either the background module or the apparatus module for pivoting the floor member about a horizontal pivot axis of the hinge and the second end opposite to the first end comprising means for detachably securing the floor member to the other of the background module or the apparatus module to maintain the background module and the apparatus module in fixed spaced apart relation to each other;

a roof module having means for detachably securing the apparatus module and the background module in the same fixed spaced apart relation as secured by the floor member.

2. The photo booth according to claim 1 covering a floor space, wherein the apparatus, background and roof modules when detached from each other are adapted for bundling in a manner where the bundled apparatus, background and roof modules occupy a substantially smaller floor space than when the apparatus, background and roof modules are secured to each other for operation as a photo booth.

3. The photo booth according to claim 1, further comprising translucent panels secured to the outside of the wall members and adapted to be illuminated.

4. The photo booth according to claim 1, the roof module further comprising keyed releasable fastening means adapted to engage with the apparatus module and the background module upon assembly of the booth.

5. A photo booth for capturing an image of a subject, the booth comprising:

an apparatus module comprising a plurality of wall members and a bottom cooperatively connected to define an enclosed space, said space including means for receiving an image capturing device and an image reproduction device;

a background module comprising a plurality of wall members and a bottom cooperatively connected to define a subject receiving space including means for providing a background for the image;

a floor member having two ends, the first end comprising means for detachably securing the floor member along the first end to the bottom of the apparatus module and the second end opposite to the first end comprising means for detachably securing the floor member along the second end to the bottom of the background module to maintain the background module and the apparatus module in fixed spaced apart relation to each other;

a roof module having means for detachably securing the apparatus module and the background module in the same fixed spaced apart relation as secured by the floor member.

6. The photo booth according to claim 5, further comprising translucent panels secured to the outside of the wall members and adapted to be illuminated.

7. The photo booth according to claim 5, the roof module further comprising keyed fastening means adapted to engage with the apparatus module and the background module upon assembly of the booth.

* * * * *